(12) United States Patent
Etemad et al.

(10) Patent No.: US 9,119,154 B2
(45) Date of Patent: Aug. 25, 2015

(54) OPPORTUNISTIC CARRIER AGGREGATION FOR DYNAMIC FLOW SWITCHING BETWEEN RADIO ACCESS TECHNOLOGIES

(75) Inventors: Kamran Etemad, Potomac, MD (US); Vivek Gupta, San Jose, CA (US); Nageen Himayat, Fremont, CA (US); Shilpa Talwar, Los Altos, CA (US)

(73) Assignee: INTEL CORPORATION, Santa Clara, CA (US)

(*) Notice: Subject to any disclaimer, the term of this patent is extended or adjusted under 35 U.S.C. 154(b) by 67 days.

(21) Appl. No.: 13/997,224

(22) PCT Filed: Oct. 1, 2011

(86) PCT No.: PCT/US2011/054494
§ 371 (c)(1), (2), (4) Date: Nov. 4, 2013

(87) PCT Pub. No.: WO2012/121757
PCT Pub. Date: Sep. 13, 2012

(65) Prior Publication Data
US 2014/0043979 A1    Feb. 13, 2014

Related U.S. Application Data

(60) Provisional application No. 61/450,070, filed on Mar. 7, 2011.

(51) Int. Cl.
*H04L 12/26* (2006.01)
*H04W 52/02* (2009.01)
(Continued)

(52) U.S. Cl.
CPC ......... *H04W 52/0251* (2013.01); *H04B 7/2656* (2013.01); *H04L 5/001* (2013.01);
(Continued)

(58) Field of Classification Search
None
See application file for complete search history.

(56) References Cited

U.S. PATENT DOCUMENTS

2007/0213059 A1* 9/2007 Shaheen ................. 455/436
2008/0220787 A1   9/2008 Stanwood et al.
(Continued)

FOREIGN PATENT DOCUMENTS

KR  10-2004-0059686 A    7/2004
WO     2012/039656 A1    3/2012
(Continued)

OTHER PUBLICATIONS

International Preliminary Report on Patentability with Written Opinion received for PCT Patent Application No. PCT/US2011/054494 mailed on Sep. 19, 2013, 6 pages.
(Continued)

*Primary Examiner* — Afshawn Towfighi
(74) *Attorney, Agent, or Firm* — Thorpe, North & Western, LLP.

(57) ABSTRACT

Systems and methods for opportunistic cross radio access technology (RAT) bandwidth allocation are disclosed. The system comprises wireless wide area network (WWAN) radio configured to be used as a primary cell (PCell) to communicate with a dual mode mobile wireless device on a licensed band and a wireless local area network (WLAN) radio integrated with the WWAN radio and configured to be used as a secondary cell (SCell) to provide additional wireless connectivity to the dual mode mobile wireless device in an unlicensed band that is controlled by the PCell. The PCell provides network access and mobility control for the dual mode mobile wireless device and also supports an opportunistic cross carrier bandwidth allocation through a cross RAT coordination module in the downlink and uplink of the SCell in the unlicensed band.

24 Claims, 6 Drawing Sheets

(51) Int. Cl.

| | | |
|---|---|---|
| *H04B 7/26* | (2006.01) | |
| *H04W 4/00* | (2009.01) | |
| *H04W 4/02* | (2009.01) | |
| *H04W 28/02* | (2009.01) | |
| *H04W 72/04* | (2009.01) | |
| *H04L 5/00* | (2006.01) | |
| *H04W 8/18* | (2009.01) | |
| *H04W 88/08* | (2009.01) | |

(52) U.S. Cl.
CPC ............... *H04W 4/005* (2013.01); *H04W 4/02* (2013.01); *H04W 28/0205* (2013.01); *H04W 72/0486* (2013.01); *H04L 5/0033* (2013.01); *H04W 8/186* (2013.01); *H04W 72/048* (2013.01); *H04W 88/085* (2013.01)

(56) References Cited

U.S. PATENT DOCUMENTS

2010/0173667 A1* 7/2010 Hui et al. .................. 455/552.1
2010/0246506 A1   9/2010 Krishnaswamy

FOREIGN PATENT DOCUMENTS

| WO | 2012/078565 A1 | 6/2012 |
| WO | 2012/121757 A1 | 9/2012 |

OTHER PUBLICATIONS

3rd Generation Partnership Project; Technical Specification Group Services and System Aspects; 3GPP system to Wireless Local Area Network (WLAN) interworking; System description (Release 9), 3GPP TS 23.234 V9.0.0 (Dec. 2009) 84 pages.
3rd Generation Partnership Project; Technical Specification Group Services and System Aspects; IP flow mobility and seamless Wirless Local Area Network (WLAN) offload; Stage 2 (Release 10) 3GPP TS 23.261 V10.0.0 (Jun. 2010) 20 pages.
3rd Generation Partnership Project; Technical Specification Group Services and System Aspects; Architecture enhancements for non-3GPP accesses (Release 10) 3GPP TS 23.402 V10.0.0 (Jun. 2010), 208 Pages.
3rd Generation Partnership Project; Technical Specification Group Core Network and Terminals; Mobility management based on Dual-Stack Mobile IPv6; Stage 3 (Release 10) 3GPP TS 24.303 V10.0.0 (Sep. 2010), 39 pages.
Extended European search Report received for European Patent Application No. 11860344.8 , mailed on Aug. 14, 2014, 7 pages.
Supplementary European Search Report received for European Patent Application No. 11860344.8 , mailed on Sep. 2, 2014, 1 page.
Choi et al., "Joint Resource Allocation for Parallel Multi-Radio Access in Heterogeneous Wireless Networks", IEEE Transactions on Wireless Communications, vol. 9, No. 11, Nov. 2010, pp. 3324-3329.
International Search Report and Written Opinion received for PCT application No. PCT/US2011/054494, mailed on Feb. 28, 2012, 9 pages.

* cited by examiner

OPPORTUNISTIC CARRIER AGGREGATION FOR DYNAMIC FLOW SWITCHING BETWEEN RADIO ACCESS TECHNOLOGIES

CLAIM OF PRIORITY

Priority of U.S. Provisional patent application Ser. No. 61/450,070 filed on Mar. 7, 2011 is claimed, and is hereby incorporated by reference.

BACKGROUND

As the use of mobile wireless devices, such as smart phones and tablet devices, becomes more ubiquitous, the demands on the limited amount of radio frequency spectrum used by those devices also increases, resulting in wireless network congestion in the licensed spectrum. In addition, the increased use of high bandwidth applications such as audio and video streaming can increase demands beyond the capability of the available spectrum. This is especially true in high density and high use locations such as large cities and universities. One projection estimates a growth of 20 times in mobile internet traffic from 2010 to 2015.

Improvements in wireless architectures, hardware design, and processor speed have significantly increased the efficiency of wireless devices in their use of the available spectrum. However, the ability to transmit a greater number of bits per second per hertz of available bandwidth may be reaching an upper limit with the currently available battery technology.

BRIEF DESCRIPTION OF THE DRAWINGS

Features and advantages of the invention will be apparent from the detailed description which follows, taken in conjunction with the accompanying drawings, which together illustrate, by way of example, features of the invention; and, wherein.

Figure 1:
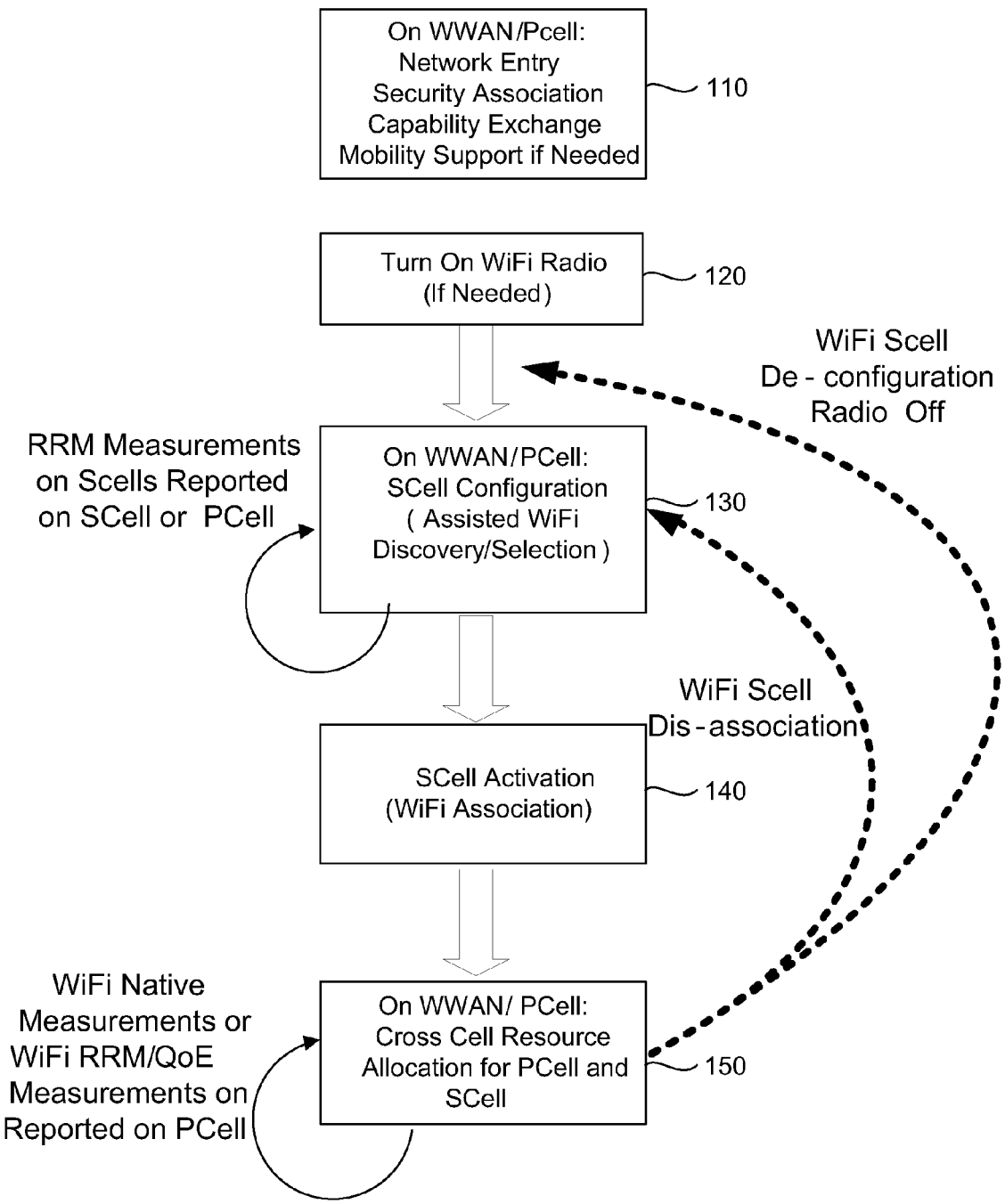
FIG. 1 illustrates a flowchart depicting an example of procedures involved in the cross radio access technology integration between a Primary access Cell (PCell) and a Secondary Access Cell (SCell) in accordance with an example.

Reference will now be made to the exemplary embodiment illustrated, and specific language will be used herein to describe the same. It will nevertheless be understood that no limitation of the scope of the invention is thereby intended.

DETAILED DESCRIPTION

Before the present invention is disclosed and described, it is to be understood that this invention is not limited to the particular structures, process steps, or materials disclosed herein, but is extended to equivalents thereof as would be recognized by those ordinarily skilled in the relevant arts. It should also be understood that terminology employed herein is used for the purpose of describing particular embodiments only and is not intended to be limiting.

DEFINITIONS

As used herein, the term "substantially" refers to the complete or nearly complete extent or degree of an action, characteristic, property, state, structure, item, or result. For example, an object that is "substantially" enclosed would mean that the object is either completely enclosed or nearly completely enclosed. The exact allowable degree of deviation from absolute completeness may in some cases depend on the specific context. However, generally speaking the nearness of completion will be so as to have the same overall result as if absolute and total completion were obtained. The use of "substantially" is equally applicable when used in a negative connotation to refer to the complete or near complete lack of an action, characteristic, property, state, structure, item, or result.

EXAMPLE EMBODIMENTS

An initial overview of technology embodiments is provided below and then specific technology embodiments are described in further detail later. This initial summary is intended to aid readers in understanding the technology more quickly but is not intended to identify key features or essential features of the technology nor is it intended to limit the scope of the claimed subject matter.

An exponential increase in the amount of wireless data transmission has created congestion in wireless networks using licensed spectrum to provide wireless communication services for wireless devices such as smart phones and tablet devices, to name a few. The congestion is especially apparent in high density and high use locations such as urban locations and universities.

One technique for providing additional bandwidth capacity to wireless devices is through the use of unlicensed spectrum, given the limited availability and high cost of licensed spectrum. Many types of wireless devices are capable of communicating via licensed spectrum, such as through a cellular network, and via unlicensed spectrum, such as via a WiFi hotspot. WiFi is a common name provided to an institute of Electronics and Electrical Engineers (IEEE) 802.11 set of standards for communicating in unlicensed spectrum including the 2.4, 3.7 and 5 GHz frequency bands. The set of standards includes the IEEE 802.11a standard released in 1999 for communication in the 5 GHz and 3.7 GHz band, the IEEE 802.11b standard, also released in 1999 for communication in the 2.4 GHz band, the 802.11g standard released in 2003 for communication in the 2.4 GHz range via orthogonal frequency division multiplexing (OFDM) and/or direct sequence spread spectrum (DSSS), and the 802.11n standard released in 2009 for communication in the 2.4 GHz and 5 GHz bands using multiple-input multiple-output (MIMO).

While WiFi has been given as an example of a standard used to communicate via an unlicensed portion of the radio frequency spectrum, additional standards for communicating in a portion of the unlicensed spectrum may also be used, including the IEEE 802.15 family of personal area networks (PAN), and Bluetooth.

Communication in an unlicensed band may occur in one of the industrial, scientific and medical (ISM) radio bands that are reserved internationally for the use of radio frequency (RF) energy for industrial, scientific and medical purposes, including but not limited to the 60 GHz band that is used for high bandwidth communication.

Standards such as WiFi or Bluetooth are used to provide wireless local area networks (WLAN) that can be accessed by dual mode devices that are also capable of accessing a cellular networking standard such as IEEE 802.16 standard, commonly referred to as WiMAX (worldwide interoperability for microwave access), and the third generation partnership project (3GPP). Releases of the IEEE 802.16 standard include the IEEE 802.16e-2005, 802.16-2009, and 802.16m-2011. Releases of the 3GPP standard include the 3GPP LTE, Release 8 in the fourth quarter of 2008 and 3GPP LTE Advanced Release 10 in the first quarter of 2011.

Currently, WLAN is integrated as a separate access network to the 3GPP evolved packet core (EPC). Existing mobile wireless device based WiFi offload solutions can enable selective switching of flows based on operator or user policies. These solutions require the operation and maintenance of a separate WLAN radio access network, thereby resulting in greater operational and capital expenditures.

In order to access both licensed and unlicensed portions of the spectrum, the mobile wireless device typically needs to authenticate on the WLAN access network as well the core network entities, such as the 3GPP network entities including the Authentication, Authorization and Accounting (AAA) server, the Policy Control and Charging Rules Function (PCRF), the Packet Data Network (PDN) gateway, and so forth. Each of these network entities also need to be aware of the WLAN access network, thus necessitating changes in 3GPP core entities and increased operational maintenance. These solutions may also have some performance limitations due to relatively longer flow switching latencies and distributed offloading decisions which are based semi-static network policies that may not take into account real time impacts to other mobile wireless devices and overall system performance.

Accordingly, a tighter integration and aggregation of cellular type networks configured to use licensed portions of the radio spectrum, with wireless local area networks designed to use unlicensed portions of the radio spectrum, can substantially improve performance. For example, the integration of 3GPP access network components, such as the eNodeB (eNB) with the WLAN access networks can enable a dual mode device to use the licensed and unlicensed portions of the spectrum with minimal impact to the 3GPP core network elements. This solution can enhance the overall user experience with without degrading the quality of service (QoS), mobility, security, and power management when capacity is expanded to the unlicensed spectrum. Changes to the WLAN access network can be minimized as well, with preferably no changes to the WLAN air-interface. The term "eNB" is used interchangeably with the term "base station" herein.

In accordance with one embodiment of the present invention, a Radio Access Network (RAN) level approach of adding capacity with unlicensed spectrum, which relies on the availability of multi-mode radio infrastructure elements, is disclosed. In one embodiment a base station can include the access point for both the unlicensed portion of the spectrum (i.e. a WLAN WiFi access point) that is integrated with an access point for a licensed portion of the spectrum (i.e. a 3GPP LTE eNB) to provide wireless wide area network (WWAN) capabilities.

The availability of a multi-mode infrastructure enables tighter coordination between the WWAN and the WLAN interfaces to better manage the WLAN offload experience, without significant changes in other parts of an operator's network. On the device side, given that most 3G and 4G devices include both 3GPP Long Term Evolution (LTE) and WiFi capabilities, such coupling may be accomplished with a relatively simple software upgrade and with no changes in hardware and lower layer implementations.

The Release 10 of the 3GPP LTE system supports bandwidth aggregation across multiple carriers or cells to provide wideband use experience using potentially fragmented spectrum. However, these capabilities are defined assuming all cells and/or carriers are operating using the same technology in the licensed spectrum over a WWAN. As heterogeneous network architectures are increasingly deployed, with layers of small cells overlaid on a macro-cell coverage area to offload traffic, it becomes relevant to develop infrastructure and technology solutions that the strengths of WLAN and WWAN protocols, including WLAN protocols over unlicensed bands.

In accordance with one embodiment of the present invention, WiFi radios in the WLAN spectrum (i.e. the unlicensed spectrum) can simply be treated as a "virtual" or "extension" carrier for seamless inclusion in the 3GPP operator's access network by extending the carrier aggregation concept. The seamless inclusion can move beyond the current technologies that still require a WWAN operator to maintain a separate access and backend core network for access to a WLAN network using a dual mode device.

WiFi Offload Framework

FIG. 1 provides a flowchart depicting an example of high level procedures involved in the cross radio access technology integration between a WWAN radio configured to be used as a Primary-access Cell (PCell) configured to communicate in a licensed band that is integrated with a WLAN radio configured to be used as a Secondary-access Cell (SCell) configured to communicate in an unlicensed band.

In one embodiment, the 3GPP's WWAN technology, such as 3GPP LTE Release 8 or Release 10, or High Speed Packet Access (HSPA), can be used to provide a Primary-access Cell to supply network connectivity, mobility, security and state management to user terminals. The framework can then be extended by using one or more WiFi links integrated with the WWAN radio that are opportunistically turned on, configured, and used to provide a Secondary extension carrier supplying additional capacity in the data plane. While the combination of LTE and WiFi is disclosed, the same principles can be used for any WWAN technology in combination with a WLAN/WPAN system, as previously discussed.

In a 3GPP LTE system, when carrier aggregation is configured, the mobile wireless device, referred to user equipment (UE), only has one radio resource control (RRC) connection with the network. At RRC connection establishment/re-establishment/handover, one serving cell provides the non-access stratum (NAS) mobility information, such as the tracking area identity. At RRC connection re-establishment/handover, one serving cell provides the security input. This cell is referred to as the Primary Cell (PCell). In the downlink, the carrier corresponding to the PCell is the Downlink Primary Component Carrier (DL PCC) while in the uplink it is the Uplink Primary Component Carrier (UL PCC).

Depending on UE capabilities, Secondary Cells (SCells) can be configured to form together with the PCell a set of serving cells. In the downlink, the carrier corresponding to an SCell is a Downlink Secondary Component Carrier (DL SCC) while in the uplink it is an Uplink Secondary Component Carrier (UL SCC).

The PCell can be configured as an anchor cell in the WWAN radio for mobile wireless devices operating within the PCell's operating range. The PCell can be an always-on connection between the mobile wireless device and the eNB, allowing the mobile wireless device to maintain a connection with the WWAN. In an embodiment using a 3GPP based PCell, cell selection and network entry, as depicted in block 110 of FIG. 1, can begin with a PCell based on criteria and procedures specified in the 3GPP Release 8, Release 9, or Release 10. The PCell can be used to affect network entry of the mobile device into a WWAN, security association, capability exchange, and mobility support, if needed. Such criteria and procedures can be used independently of whether and when a cross cell/Radio Access Technology (RAT) operation is subsequently initiated.

When an eNB requests an SCell to be configured, the PCell can turn on a WiFi radio integrated with the WWAN radio, if necessary, as shown in block 120. In one embodiment, inter-RAT capabilities and configuration options for cross cell operations can be negotiated through the PCell. For example, the inter-RAT capabilities and configuration options for cross cell operations can be negotiated between an eNB and a UE. The eNB can provide WWAN network connectivity and maintain the state and mobility control of the UE through the PCell. The PCell can also carry control channels used for normal PCell assignments and for cross-cell assignments. The PCell may also carry some of the UE service flows, such as low latency services like voice data.

The SCell can be configured to provide access for a dual mode mobile wireless device to a WLAN radio access point. The connection between the mobile wireless device and the WLAN radio access point can be an "on-demand" opportunistic type of connection. When communication between the mobile wireless device and the eNB via the PCell is in need of additional bandwidth, the eNB can communicate with the WWAN radio via the PCell to create an SCell connection with the WLAN access point to offload some data traffic flows to the SCell to provide a desired amount of additional bandwidth capability for the dual mode mobile wireless device without requiring the use of additional bandwidth in the licensed spectrum.

The SCell can be established, configured, and used for cross carrier allocations in the data plane through the PCell. The SCell allocations are opportunistic, and may be initiated only when needed, such as when there is a high level of traffic or interference conditions exist in the WWAN. The opportunistic allocations from the SCell may also be provided at additional opportunities, as can be appreciated.

The SCell can be configured with assistance from the PCell to provide discovery and selection information, as shown in block 130. SCell configuration, such as WiFi configuration information, may be broadcast or multicast from the eNB to all relevant dual mode wireless mobile devices. The relevant mobile devices can include all mobile devices within a range of the eNB. Alternatively, the configuration information may only be sent to those mobile devices that am dual mode devices capable of communicating with a selected WLAN access point, or another desired selection metric.

In another embodiment, the configuration information can be communicated to selected mobile devices through dedicated Radio Resource Control (RRC) signaling. Radio Resource Management (RRM) measurements made on the SCells can be reported on the SCell or the PCell. Transmitting WiFi configuration information on the PCell can provide the mobile wireless device(s) with sufficient configuration information to allow the mobile wireless devices to quickly tune and associate with a target WiFi radio access point in either an adhoc mode or an infrastructure mode.

Once the SCell has been configured, a data link in an unlicensed band between a dual mode wireless device and the WiFi radio access point via the SCell can then be opportunistically activated by the PCell, as shown in block 140 of FIG. 1. The activation of the SCell marks the start of frequent cross cell measurements of the SCell by the PCell. The cross cell measurements can be used to facilitate a desired level of QoS management by the PCell of the unlicensed band connection provided by the SCell. The cross cell measurement and reporting is carried by PCell bearers. The activation step shown in block 140 may be simplified and combined with the configuration step in block 130 to minimize impacts to the media access control (MAC) layer of the PCell. The cross cell measurements will be discussed more fully below.

Block 150 of FIG. 1 illustrates that the PCell can allocate cross cell resources for the PCell and SCell. In one embodiment, the SCell may be used to carry traffic flows to the UE in unlicensed bands that were originally intended to be carried by the PCell on licensed bands. Alternatively, the flows may be partitioned amongst the PCell and SCell, depending on the QoS available on each carrier in the licensed and unlicensed bands. In another scenario, only selective flows may be offloaded to the SCell while the remaining traffic flows may continue to be supported by the PCell using a licensed band.

WiFi native measurements or WiFi RRM and Quality of Experience (QoE) measurements can be reported on the PCell. Based on channel conditions, load patterns, and operator policies, selective flows can be moved from the PCell using licensed spectrum to the SCell using unlicensed spectrum and vice versa. The network and the UE can be configured to support additional logic including additional signaling, buffering, and synchronization used to move the service flows between the PCell and SCell.

When criteria such as a need for higher QoS or greater bandwidth for the UE no longer holds, the SCell can be de-configured. De-configuration can involve turning off the WiFi radio at the UE to help save power usage at the UE and avoid unnecessary interference with other WiFi nodes.

In one embodiment, a UE connected to an eNB via a PCell may only turn the WiFi data link on if it is directed to do so by the eNB via the PCell or through user intervention for other WiFi usage (such as user directed WiFi usage). For simplicity of operation in a given UE, the WiFi interface may either be in an SCell mode or act as an independent interface. When the WiFi interface is in the SCell mode, it can be controlled by the PCell, as previously discussed. When it is in an independent mode, then the WiFi radio may not be under the control of the PCell. The WiFi interface will not typically be in both the SCell mode and the independent mode at the same time.

The WiFi radio access point that is integrated with eNB to provide an SCell connection with the UE may also be de-configured and turned off if it has been deactivated for all UEs and is not expected to be used. Such de-configuration does not impact network connectivity for any UEs since they are still maintained through the PCell based on a selected standard, such as 3GPP LTE. The de-configured WiFi radio may be turned back on later as the need arises.

PCell and SCell Architecture

In order to implement a WWAN radio operable to be used as a PCell that is integrated with a WLAN radio operable to be used as an SCell that is configured through the PCell, various architectural limitations exist due to the relatively low power and short range of a typical SCell configured to communicate in an unlicensed band. For example, the IEEE 802.11n specification represents one of the longer range specifications for the communication of data in an unlicensed spectrum, with a range of approximately 250 meters (820 feet). In contrast, typical base stations, such as an eNB, may have an effective range of several kilometers. To accommodate the integration of the WWAN and the WLAN, several architectures may be used.

FIGS. 2a-2c illustrates three different example architectures. FIG. 2a illustrates an example 3GPP LTE system in which an eNB 205 is connected to a core network 204 through a wired or wireless connection, as defined in the 3GPP LTE specification. The core network 204 can include a serving gateway and a Packet Data Network (PDN) gateway. In this example, the eNB 205 is directly integrated with a WLAN Radio comprising an IEEE 802.11 compliant access point, illustrated as a WiFi radio 206. The eNB carries the PCell which is maintained as an "always on connection" 213 with a UE 208. The WiFi radio 206 carries the SCell and maintains an on-demand connection 211 with a WiFi radio 210 integrated with the UE 208.

In order to allow the eNB 205 and the WiFi radio 206 to communicate to form the on-demand SCell connection 211, the eNB can have a range that is approximately equal to or less than a range of the WiFi radio. For example, the WiFi radio may be an 802.11n radio that has a maximum range of approximately 250 meters. The eNB can be a micro-cell, a femtocell, a home eNB gateway (HeNB GW), or other type of WWAN access point that has a range of about 250 meters.

Alternatively, the WiFi radios 206, 210 that are used to support the SCell connection 211 may have a longer range. For example, the WiFi radios 206, 210 may be based on the IEEE 802.11y-2008 standard that offers an extended range at 3.7 GHz of approximately 5,000 meters (5 kilometers) radius from the integrated WiFi radios. The WWAN 205 radios integrated in the eNB 205 and the UE 208 can be configured to have a similar 5 kilometer range. While a single WiFi access point is illustrated in FIGS. 2a-2c, each eNB may be coupled with a plurality of WiFi radios, or other types or radios configured to communicate in unlicensed bands, as previously discussed. The plurality of unlicensed radios can be used to accommodate high levels of traffic from a plurality of mobile wireless devices (i.e. UEs). In one embodiment, the WLAN access point 206 can include two or more different types of radios configured to communicate in an unlicensed spectrum. For example, the WLAN access point may include as WiFi radio and a Bluetooth radio. The PCell connection 213 can be used to control offloading of data flows to at least one of the WiFi radio, the Bluetooth radio, or even both simultaneously.

In another embodiment, FIG. 2b illustrates an example of a different architecture, wherein an eNB 212 is connected to a core network 214 through a wired or wireless connection, as previously discussed. The eNB can be configured to serve a large area, such as a radius of multiple kilometers. The eNB can be connected to a plurality of integrated relay nodes 217.

In the example architecture of FIG. 2b, each integrated relay node 217 is comprised of a relay node 215 integrated with a WiFi radio 216 or another type of WLAN radio. Each WiFi access point 216 can be used to create one or more SCells to provide bandwidth in an unlicensed band. Each relay node can be configured to relay an UL PCC and a DL PCC between the eNB 212 and a mobile wireless device such as a UE 218. The UE can communicate with the WiFi access point 216 via an SCell over a selected radius. As previously discussed, the communication range of the WiFi access point may vary from a few dozen meters to thousands of meters, depending on the type of radio used to communicate via an unlicensed band. While a WiFi access point is used in this example, other types of unlicensed radios may be used to form the SCell connection as well, as previously discussed.

Each relay node 215 in FIG. 2b, carrying a UL PCC and a DL PCC via the PCell, can maintain an always-on connection 223 with a UE 218 in a WWAN. Each relay node can also communicate with the eNB 212. The WiFi radio 216 can form an on-demand connection 221 with a WiFi access point 220 integrated with the UE 218 to provide additional bandwidth in an unlicensed band. The on-demand connection can be managed via the PCell 217.

An additional example architecture is illustrated in FIG. 2c. An eNB 222 is connected to a core network 224 through a wired or wireless connection, as previously discussed. The eNB can be configured to serve a large area, such as a radius of multiple kilometers. The eNB can be connected to a plurality of integrated Remote Radio Elements (RREs) 227. The term RRE, as used herein, can be synonymous with a Remote Radio Head (RRH) or a Remote Radio Unit (RRU). Unlike a relay, the RRE/RRH/RRU can perform some processing of the component carriers prior to communicating them to the eNB.

In the example architecture illustrated in FIG. 2c, the integrated RRE is comprised of one or more RREs 225, 235 that are integrated with WiFi radio nodes 226, 236 respectively. The WiFi radio nodes 226, 236 can each form one or more SCells with the eNB 222. Alternatively, each RRE may only be a WiFi radio. Each RRE 226, 236 can be connected to the eNB via a radio over fiber connection 229, 239 or another type of broadband connection.

The eNB 222 can form an always-on connection 233, 243 with each UE 228, 238 respectively via a PCell. An on-demand connection 231, 241 can be formed between WiFi radios 226 and 236 via an SCell through the WiFi radios 230, 240 that are integrated with the WWAN radios at a UE 228, 238 respectively to provide additional bandwidth in an unlicensed band to the UE. The integrated RRE 227 can include an eNB in communication with multiple integrated RREs and WiFi access points. An SCell can be selectively activated at the UE by the eNB via one of the WiFi radios based on the UE's location relative to the integrated RREs.

FIGS. 2a-2c provide several example architectures in which a WWAN radio, such as a 3GPP LTE radio or a WiMAX radio, is integrated with an WLAN radio, such as a WiFi radio or a Bluetooth radio, to provide tighter coordination between the use of licensed spectrum via a PCell operating in the WWAN and the use of unlicensed spectrum via an SCell operating in the WLAN. The integration can provide interfaces to better manage the WLAN offload experience, without significant changes in other parts of an operator's network. These examples are not intended to be limiting. Other types of architectures that allow a PCell configured to communicate in a licensed band to be integrated with an SCell configured to communicate in an unlicensed band can also be formed, as can be appreciated.

In each of the example architectures of FIGS. 2a-2c, the WiFi connection can be established to carry the SCell in an infrastructure mode or as an adhoc connection between the WiFi access point and the UE (such as WiFi Direct). The WiFi radio transmission and/or reception on both the access point and the UE side can be turned on and off as controlled via the PCell such that unnecessary interference is avoided and power consumption is reduced.

Figure 2:
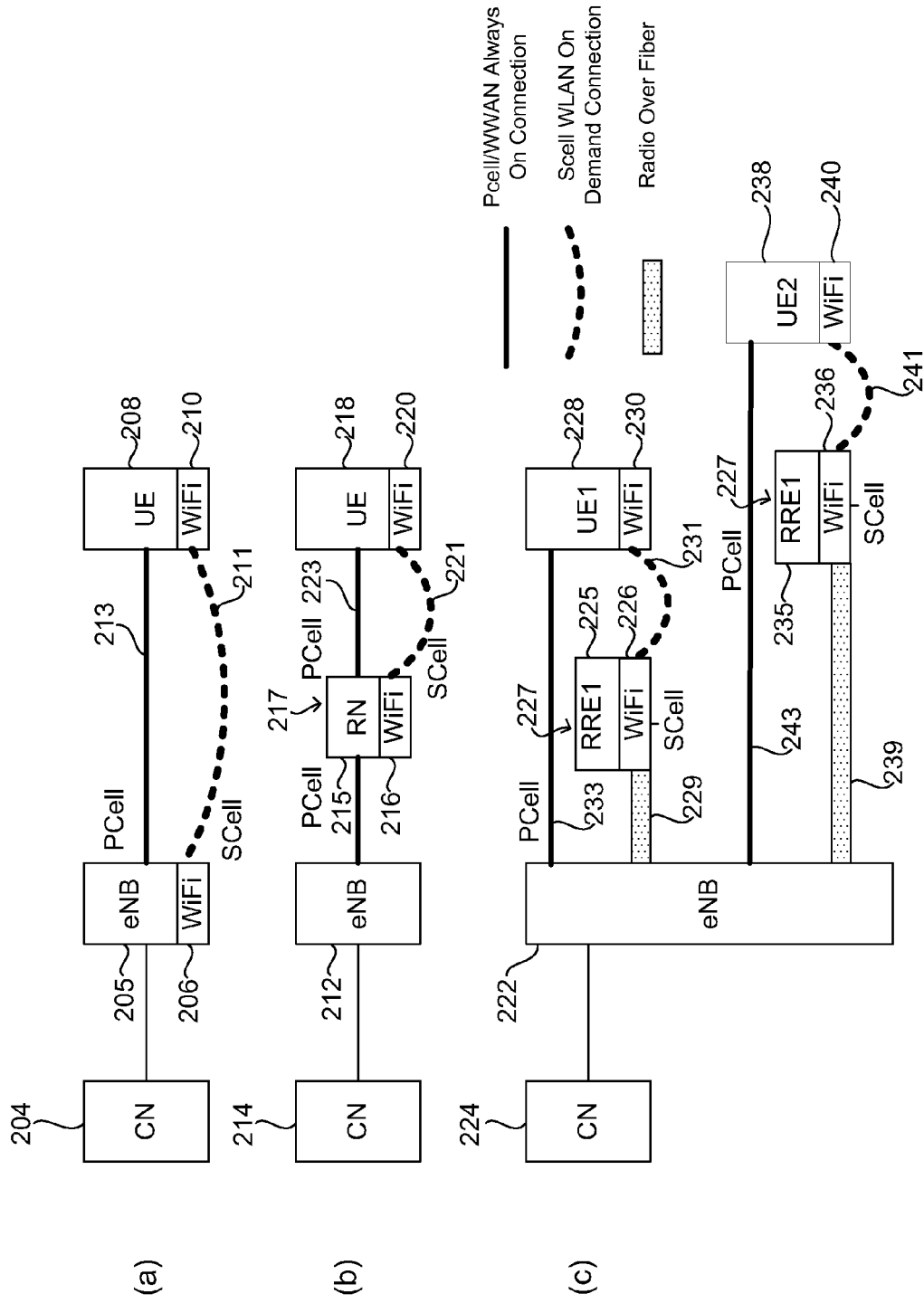
FIG. 2a illustrates a block diagram of a first architecture of a base station having an integrated PCell and SCell in accordance with an example.
FIG. 2b illustrates a block diagram of a second architecture of a base station having an integrated PCell and SCell in accordance with an example.
FIG. 2c illustrates a block diagram of a third architecture of a base station having an integrated PCell and SCell in accordance with an example.
Figure 3:
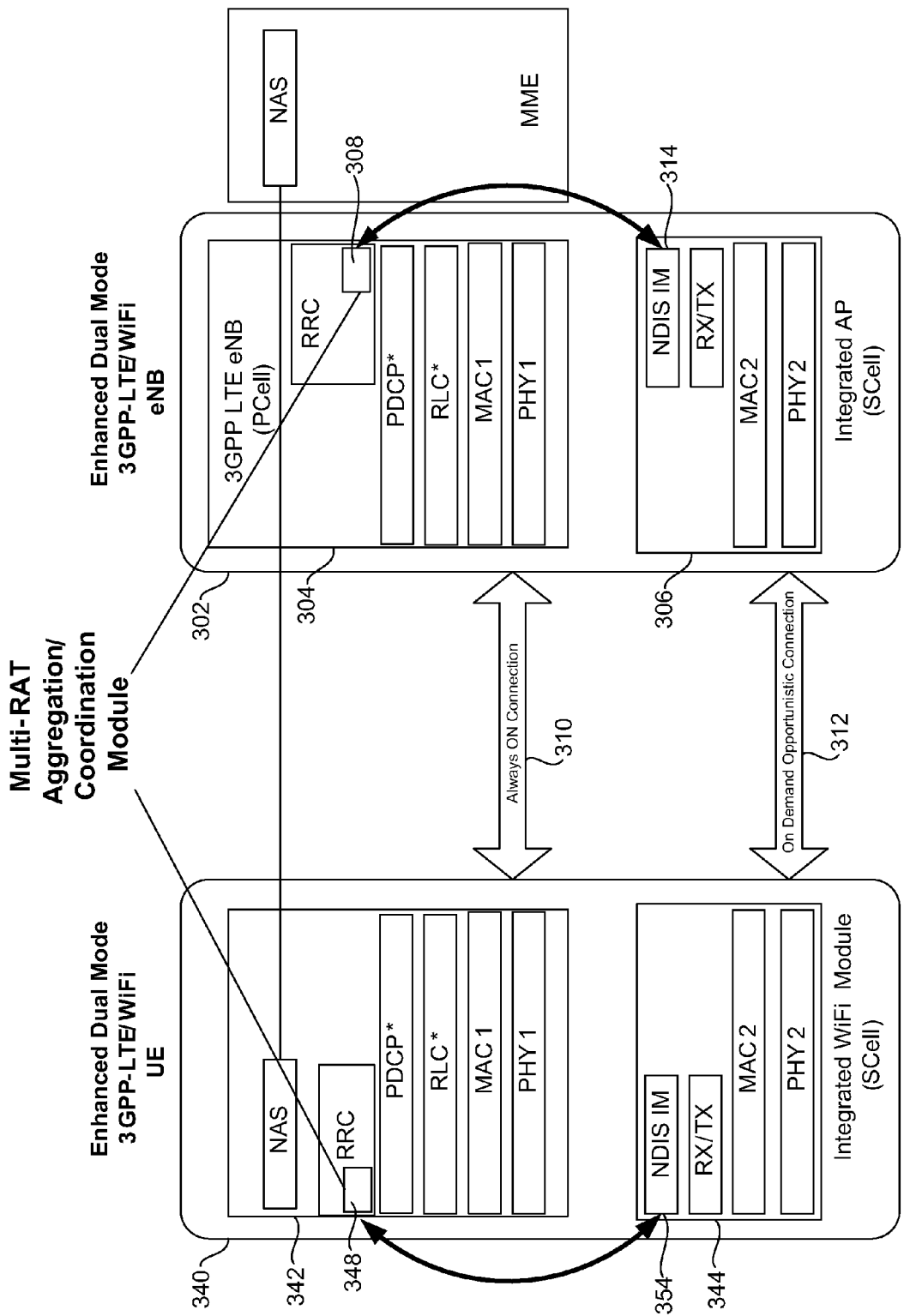
FIG. 3 illustrates a block diagram of a base station having a PCell integrated with an SCell in communication with a dual mode wireless device in accordance with an example.

FIG. 3 illustrates one example of a base station 302 having a WWAN radio 304 (configured to be used as a PCell) integrated with WLAN access point 306 (configured to be used as an SCell). The PCell can form an always-on connection 310 in a licensed band with a dual mode mobile wireless device 340 to connect the device 340 with a WWAN through a core network, as shown in FIG. 2. The WWAN radio 304 can control the integrated WiFi radio to form an SCell as an on-demand opportunistic connection 312 with the dual mode wireless device 340 in an unlicensed band.

In the example illustrated in FIG. 3, the base station 302, is an enhanced dual mode 3GPP LTE/WiFi eNB. The UE 340 is an enhanced dual mode 3GPP-LTE/WiFi dual mode mobile wireless device. As previously discussed, the WWAN radio 304 in the base station can include any type of radio configured to connect a mobile wireless device to a WWAN, such as a 3GPP LTE radio, a WiMAX radio, or the like. The WWAN is typically configured to operate in a licensed spectrum. However, it is possible that a WWAN may be formed to operate in the unlicensed spectrum using, for example, a radio configured to operate based on the IEEE 802.11y specification. The WLAN radio 306 integrated in the base station 302 can include any type of radio configured to connect a mobile wireless device to a WLAN, such as a WiFi radio, a Bluetooth radio, a 60 GHz radio, and the like. The WLAN radio will typically operate in an unlicensed spectrum.

The mobile wireless device 340 in this example is an enhanced dual mode 3GPP LTE/WiFi UE. However, the mobile wireless device can be any type of device that includes at least a WWAN radio 342 configured to form an always-on connection 310 via a PCell and a WLAN radio 344 that is controlled by the WWAN radio via the eNB 302 to form an on-demand opportunistic connection 312 to carry an SCell to allow data flows to be offloaded from the always-on connection to the on-demand connection and/or carried by the on-demand connection instead of the always-on connection.

The WWAN radio 304 in the eNB 302 and the WWAN radio 342 in the UE 340 can each include a physical layer (PHY 1), a media access control layer (MAC 1), a radio link control layer (RLC), a packet data convergence protocol layer (PDCP), and a radio resource control (RRC) layer. At the RRC layer, a multi-Radio Access Technology (RAT) aggregation and coordination (MRAT AC) module 308 in the WWAN radio 304 is configured to communicate with the unlicensed spectrum WLAN radio 306 at the eNB 302. The MRAT AC module can coordinate the use of the SCell to transmit and receive data via the unlicensed spectrum, as previously discussed. The MRAT AC module enables data to be communicated on an on-demand basis over the WLAN via an L2 (layer 2) transport link. The MRAT AC module 348 in the UE 340 can perform similar functions to enable the WWAN radio 342 and the WLAN radio 344 to communicate to allow the data flows to be partitioned amongst the PCell and SCell as previously discussed. The function of the MRAT AC module will be discussed more fully below.

Figure 4:
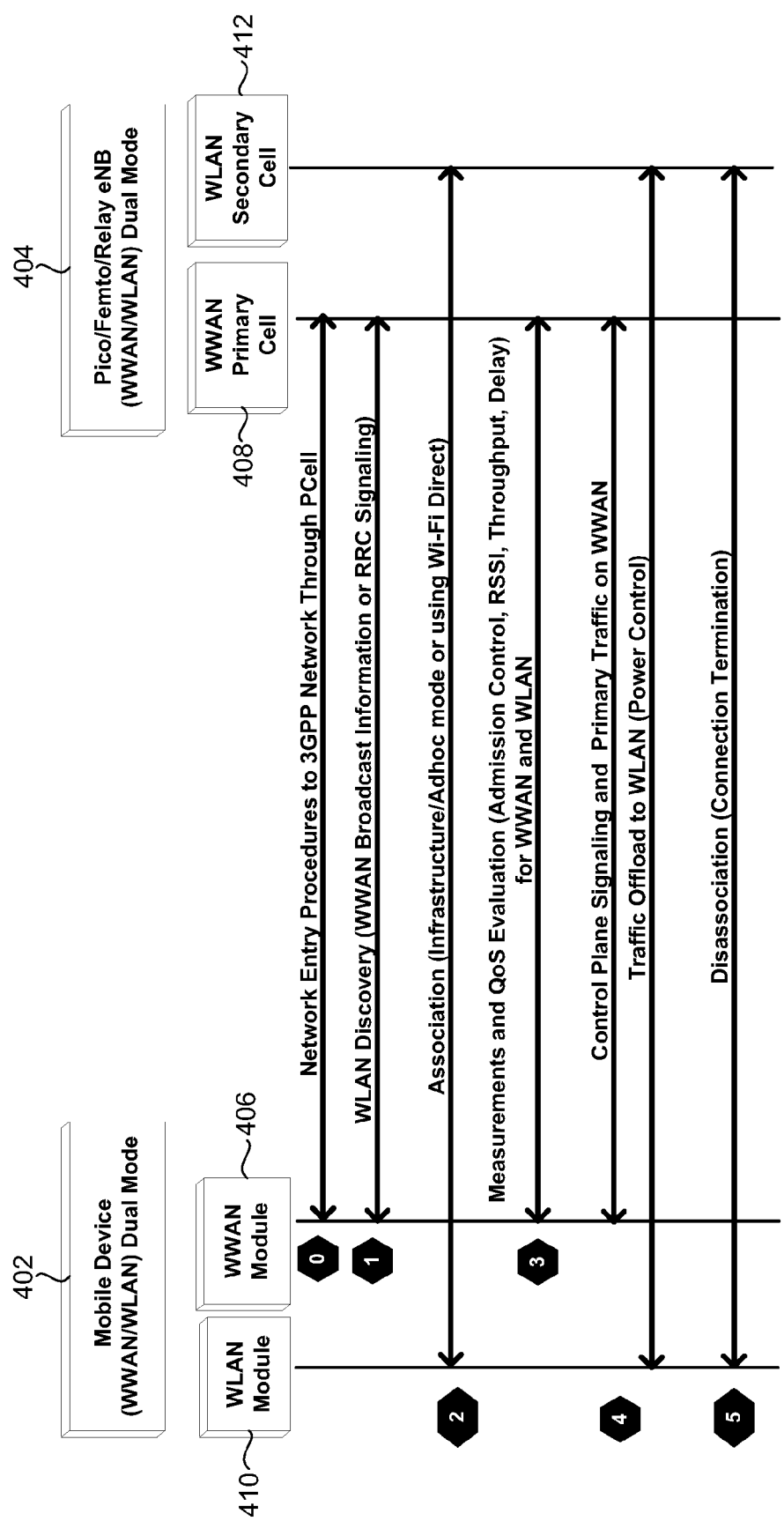
FIG. 4 illustrates a flowchart of steps involved in setting up a Wireless Local Area Network connection with the SCell in accordance with an example.

FIG. 4 illustrates one example of steps involved in setting up the WLAN connection and bearer paths and the segregation of traffic flows across the WWAN and WLAN radios. FIG. 4 shows the communications that can take place between a dual mode mobile wireless device 402 and a dual mode base station 404 that includes a WWAN radio 408 configured to carry a PCell that is integrated with a WLAN access point 412 configured to carry an SCell. The dual mode base station device can have a variety of configurations, as previously discussed with respect to the examples illustrated in FIGS. 2a-2c.

The mobile wireless device 402 can include a WWAN module 406. The WWAN module is comprised of a WWAN radio and software configured to form a WWAN radio link to communicate with, and connect with network services through, a PCell. The WWAN radio link is also referred to as a WWAN connection. Network entry of the dual mode mobile wireless device 402 to a 3GPP based network through the PCell can be performed between the WWAN module 406 and the WWAN radio 408 at the dual mode base station 404, as detailed in the 3GPP LTE specification. Other types of WWAN radios can form a WWAN link according to a specification associated with the WWAN radio.

The dual mode mobile wireless device 402 can also include a WLAN module 410 that is configured to communicate with the WLAN access point 412 to provide an opportunistic WLAN connection. The WLAN module is comprised of a WLAN radio and software configured to form a WLAN radio link to communicate with the WLAN access point 412 via an SCell, as directed by the PCell.

FIG. 4 illustrates one example of communications than can occur between the WWAN module 406, the WWAN radio 408 via a PCell and the WLAN module 410, and the WLAN access point 412 via the SCell to enable an always-on connection with a WWAN network and an on-demand opportunistic WLAN network connection between the dual mode wireless mobile device 402 and the base station 404, as previously discussed. The steps, as numbered in FIG. 4, are more fully discussed below.

1. WLAN Discovery, Selection

The WLAN discovery and selection can be based on information broadcast from the WWAN radio 408 in the dual mode base station 404 via a PCell to the WWAN module 406 on the dual mode mobile wireless device 402. The information may be broadcast to the dual mode mobile wireless device in WWAN System Information Blocks (SIBs) or through explicit RRC exchange. While it may be possible for a WLAN radio in the mobile wireless device to independently listen to beacons or send probe requests to gather WLAN configuration information, the information broadcast from the WWAN radio (via the PCell) can assist with faster discovery and selection with a desired node.

The following WLAN parameters can be made available via the WWAN broadcast from the WWAN radio 408 to assist the dual mode mobile wireless device 402 with WLAN configuration and selection:

Network Identifier—This can be a combination of the Service Set Identifier (SSID) for the WLAN and a Homogeneous Extended SSID (HESSID);

Home Operator—This can include a Friendly Name, Realm, and Fully Qualified Domain Name (FQDN);

Roaming Partner List—An FQDN, and an Operator Organization Identifier (OI) issued by the IEEE WiFi Alliance (WFA);

Radio Parameters—Including a channel identifier, frequency bands, and maximum data rate; and Connection Mode—Infrastructure mode, Adhoc mode, or WiFi direct (peer to peer).

This list is given as an example of parameters that can be made available to assist with the dual mode mobile wireless device 402 with WLAN configuration. The list is not considered to be conclusive. Additional parameters may be made available based on system design and functionality.

2. WLAN Association

In one embodiment, the dual mode mobile wireless device 402, such as a UE, can be assisted by information received via the WWAN module 406 to retrieve the relevant configuration information and power on a target WLAN radio in the WLAN module 410 that is configured to operate in an unlicensed band, such as a WiFi radio. The WWAN radio 408 at the dual mode base station 404 (eNB) may obtain preliminary measurements of selected properties of a WLAN data link formed between the WLAN access point 412 and the WLAN module 410. The preliminary measurements can include a Received Signal Strength Indication (RSSI) of the WLAN data link, among other measurements. Based on the preliminary measurements, a decision may be made to offload a selective number of traffic flows (bearer paths) that are currently carried on the WWAN based on available bandwidth. In one embodiment, all of the traffic flows may be moved from the WWAN to the WLAN. Alternatively, selected traffic flows may be maintained on the WWAN for additional reasons such as quality of service (QoS).

Once a decision is made to potentially offload some traffic, the dual mode mobile wireless device 402 can initiate a layer 2 (L2) connection between the WLAN radio in the WLAN module 410 and the WLAN radio 412 to form the SCell. When the WLAN radios are operating as specified by the IEEE 802.11 specification, this could be an association in the infrastructure or adhoc mode or a WiFi direct connection based on peer to peer networking.

In one embodiment, the data flows from the PCell and the SCell can be aggregated at the dual mode mobile wireless device 402 and/or the dual mode base station 404 (eNB) at the MAC layer. However, it is also possible to aggregate the data flows at a higher level than the MAC layer, such as at a layer that is below the PDCP layer. A determination as to how the data flows are aggregated can be based on system design requirements.

3. QoS Monitoring and Improvements in Unlicensed Bands

Once an association is established, the WWAN radio 408, through the dual mode eNB 404 may conduct regular QoS evaluations of the L2 path via the WLAN radio in the WLAN module 410. This can include retrieving several parameters of the L2 connection between the WLAN module 410 and the WLAN radio 412 using the WWAN link between the WWAN module 406 and the WWAN radio 408. The parameters can include RSSI, packet delay, packet loss rate, packet delay jitter, and so forth. Some of these parameters will be in addition to the native channel quality reporting mechanisms that may be available on a standardized WLAN link, such as WiFi or Bluetooth. For example, WiFi supports channel sounding for full Channel State Information (CSI) as well as Modulation and Coding Scheme (MCS) feedback mechanisms. The network may configure reporting of this feedback over the WWAN link on the PCell to reduce contention on the WLAN link. The ACK/NACK reports and error monitoring of the WLAN access point provided by the SCell can also provide additional processes for assessment of the WLAN link quality.

It should be noted that the carrier aggregation framework for offloading traffic to unlicensed spectrum can help improve the QoS for unlicensed spectrum beyond what is possible through simple WLAN offloading currently available. The dual-radio (or multi-radio) resource management and admission control function can identity selected traffic flow types for offloading to the WLAN based on the QoS requirement for selected types of data. For example, traffic flow types with substantially low latency data, such as voice data, may be carried on the WWAN. Data types that allow greater latency may be offloaded to the WLAN. The admission control function can also use real-time loading conditions across the radio access technologies.

In addition, traffic flow can be dynamically switched across the radio access technologies (i.e. between the WWAN and the WLAN) based on the link condition of each radio link. While WiFi Multimedia (WMM) extensions may also be used to prioritize QoS sensitive traffic across a WiFi link, improved QoS for offloaded traffic may only be achieved through dynamically adjusting the mapping of traffic across licensed and unlicensed spectrum based on projections of estimated link quality for each type of spectrum. The mechanisms for dynamic mapping of flows across RATs are described in the following section.

4. Traffic Offload

Once a decision is made to offload traffic, an appropriate message can be sent in the control plane of the WWAN connection from the WWAN radio 408 to the WWAN module 406 at the dual mode mobile wireless device 402 using the PCell to route specific bearers on to the WLAN radio link. The downlink data packets arriving on the network (i.e. from the pico cell/femto cell/relay/RRE eNB) can be encapsulated in a WLAN frame and sent to the dual mode mobile wireless device over the WLAN radio in the SCell 412. In one embodiment, no additional security is required since the packets can be already encrypted on the WWAN side. The WLAN connection acts as an L2 transport.

FIG. 3 shows one example in which the MRAT AC module 308 in the WWAN radio 304 can rout selected flows service data units (SDU) from the PDCP layer to the Network Driver Interface Specification (NDIS) Intermediate Driver (IM) 314 in the WLAN radio 306. The data can then be communicated by the WLAN radio via the L2 transport connection. A WLAN driver in the WLAN module at the dual mode wireless mobile device 340, such as the NDIS IM driver 354 can segregate this traffic based on the source MAC address of the WLAN radio on the network. This MAC address can be included in all data packets received by the WLAN driver at the dual mode mobile wireless device.

Returning to FIG. 4, uplink packets on the dual mode mobile wireless device 402 can be transferred from the WWAN to the WLAN driver stack. For example, FIG. 3 provides one example, wherein the uplink packets can be transferred from the MRAT AC module 348 in the WWAN radio 342 to the Network Driver Interface Specification (NDIS) Intermediate Driver (ID) 354 of the WLAN radio 344. Returning to FIG. 4, the traffic offload uplink packets can then be communicated via an L2 transport from the WLAN module 410 to the WLAN radio 412 in the base station 404 using the SCell. The control plane signaling and primary traffic can continue to be carried on the WWAN radio link between the WWAN module 406 at the dual mode wireless mobile device 402 and the PCell 408 at the base station 404.

In one embodiment, while both the WWAN link and the WLAN link between the dual mode wireless mobile device 402 and the base station 404 may be used for transporting a particular traffic flow, only a single link is typically active per flow at any given time to ensure the in-sequence delivery of data packets to the WWAN interface. Using a single link per flow allows the QoS per flow to be improved significantly.

When data is communicated from the dual mode wireless mobile device 402 to the base station 404 on the uplink, the dual mode base station (eNB) 404 may control the offload of data traffic across the WLAN and WWAN link based on QoS considerations and link quality conditions, as measured by WWAN and/or WLAN uplink receivers. The WWAN radio 408 may regulate the offloading of traffic flows by responding to an uplink bandwidth request by either allocating uplink bandwidth grants or indicating that the UE shall send data using the WLAN module and the interface between the WWAN and WLAN modules, as previously discussed.

5. Disassociation and Connection Termination

Once the desired data has been communicated on the WLAN, the network can send a "Disassociate" message to the dual mode wireless mobile device 402 and the WLAN connection can be terminated. The traffic flow may or may not continue over the always-on WWAN link at this point in time, as can be appreciated.

The use of the MRAT AC modules to enable the WWAN radio to opportunistically offload traffic flows to a WLAN radio enables efficient utilization of unlicensed spectrum to supplement the sue of licensed spectrum in a WWAN. Link aware cross RAT scheduling of individual flows can be performed to achieve better capacity and provide an additional tool for interference management as well. In one embodiment, the cross RAT traffic can be scheduled by the eNB to provide power management through optimized and on-demand use of the WLAN radio which can improve the battery life of the dual mode wireless mobile device.

In one embodiment, a base station, such as an eNB, can provide "real-time" monitoring of link conditions and traffic offload decisions for multiple UEs. The real-time monitoring can outperform the client initiated mechanisms that are currently available, which typically rely on semi-static network policies.

In another embodiment, there can be little to no overhead in management of a WLAN access network, such as a WiFi network, since the integrated WWAN radio and WLAN radio architecture to provide a PCell using licensed spectrum and one or more SCells using unlicensed spectrum represents a simplified WiFi deployment with no need for a separate backhaul or core network. Accordingly, there is no requirement for separate authentication, billing, and charging functions. Therefore, the system can fully benefit from reusing the advanced mobility, enhanced security and power management of primary WWAN access technologies such as 3GPP LTE.

The integrated PCell and SCell can provide an enhanced quality of service for data streams communicated over an unlicensed band through dynamic, QoS aware, fast offloading of traffic flows to the unlicensed band of the WLAN. While several examples have been provided of SCells being formed to use unlicensed spectrum for each paired uplink secondary component carrier and downlink secondary component carrier (SCell), it is also possible to form an SCell using licensed spectrum. For instance, one SCell may be formed using licensed spectrum, and another SCell may be formed using unlicensed spectrum.

Figure 5:
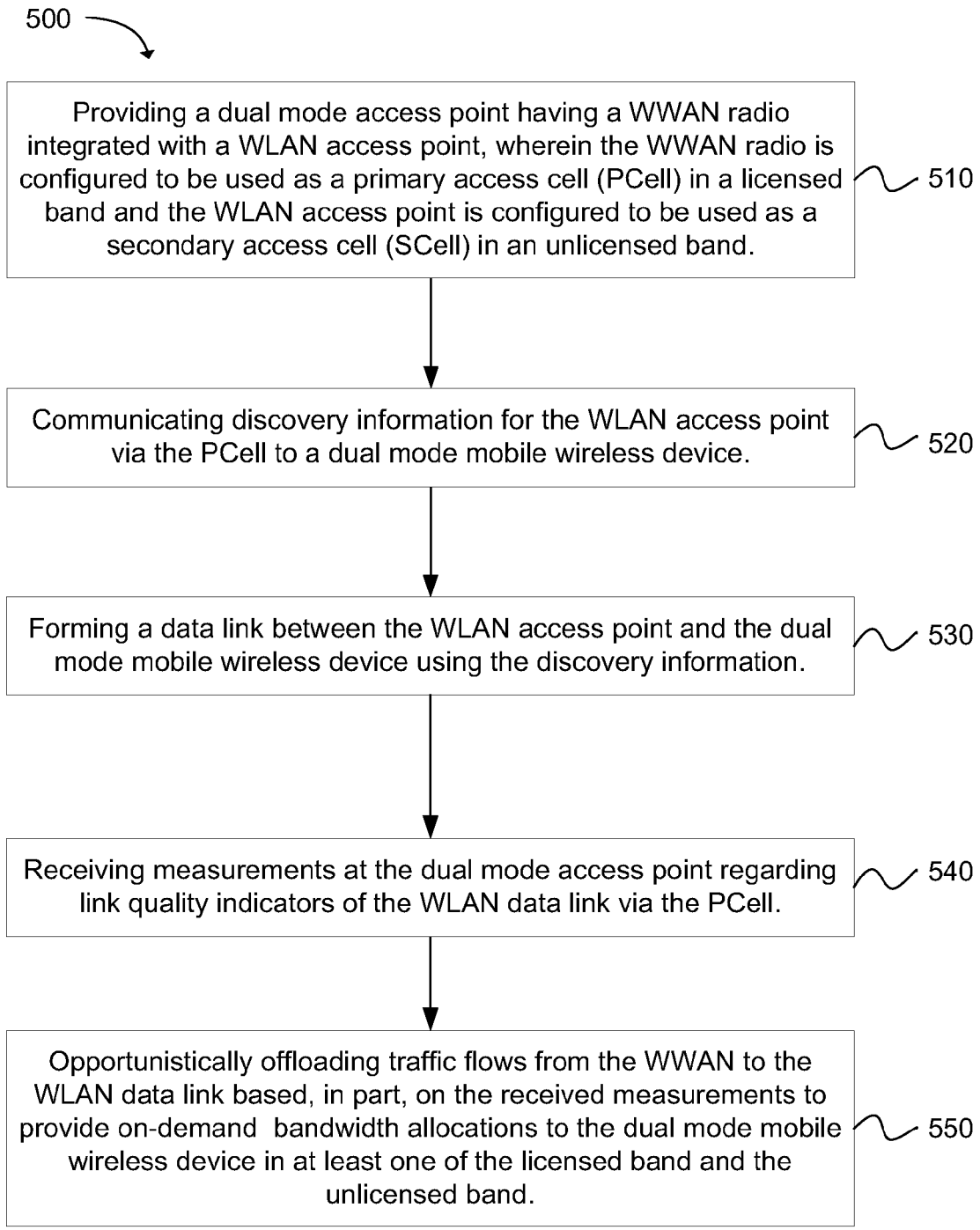
FIG. 5 depicts a flow chart of a method for conducting opportunistic carrier aggregation across a wireless wide area network (WWAN) and a wireless local area network (WLAN) in accordance with an example.

In another embodiment, a method 500 for conducting cross radio access technology (RAT) bandwidth allocation across a wireless wide area network (WWAN) and a wireless local area network (WLAN) is disclosed, as depicted in the flow chart of FIG. 5. The method comprises providing 510 a dual mode access point having a WWAN radio integrated with a WLAN access point, wherein the WWAN radio is configured to be used as a primary access cell (PCell) in a licensed band of radio spectrum, and the WLAN access point is configured to be used as a secondary access cell (SCell) in an unlicensed band of radio spectrum. A determination of what portions of the bandwidth are licensed and unlicensed can be determined based on a local, regional, or national licensing entity. For example, in the United States, the Federal Communication Commission sets rules on radio spectrum use. As previously discussed, the unlicensed band can be a portion of the band that is free for use without a specific license, such as the internationally for the use of radio frequency (RF) energy for industrial, scientific and medical purposes.

The method 500 further comprises communicating 520 discovery information for the WLAN access point can be communicated via the PCell to a dual mode mobile wireless device. A data link is formed 530 between the WLAN access point and the dual mode mobile wireless device using the discovery information. Measurements are received 540 at the dual mode access point regarding link quality indicators of the WLAN data link via the PCell. Traffic flows can be opportunistically offloaded from the WWAN to the WLAN data link based, in part, on the received measurements to provide on-demand bandwidth allocations to the dual mode mobile wireless device in at least one of the licensed band and the unlicensed band. The WLAN link can be turned on and off based on the need to offload traffic flows from the WWAN.

Figure 6:
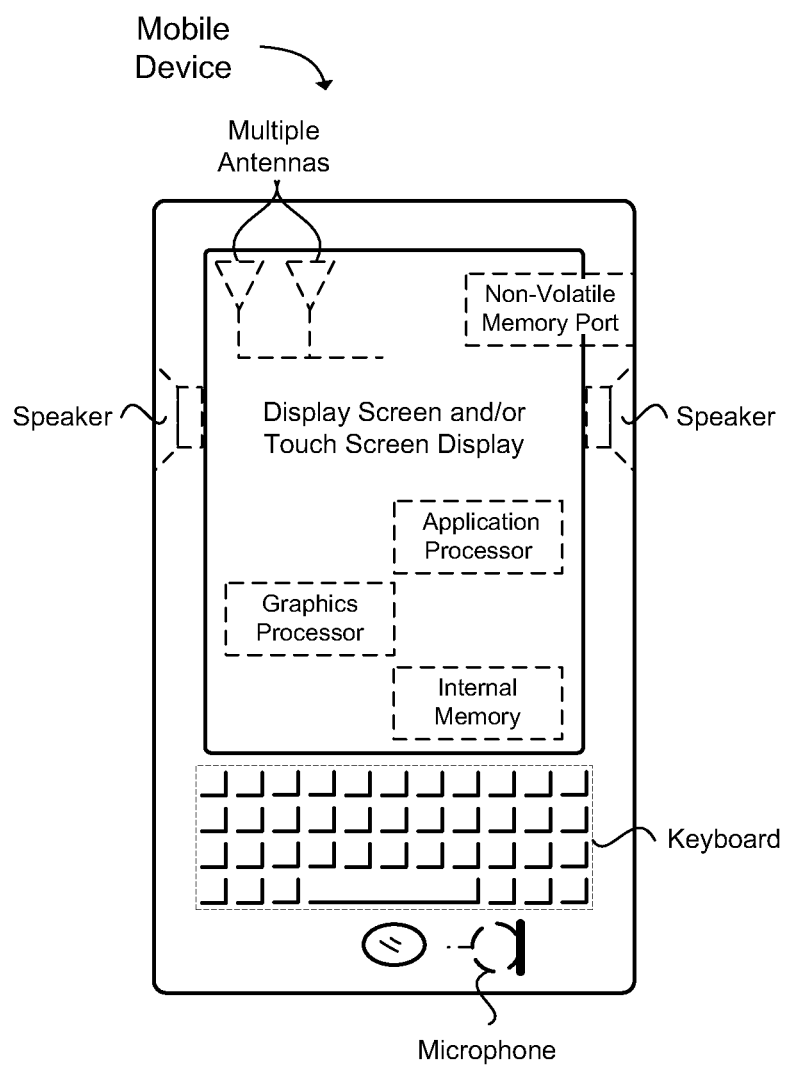
FIG. 6 illustrates a mobile wireless device in accordance with an example.

FIG. 6 provides an example illustration of a mobile device, such as a user equipment (UE), a mobile station (MS), a mobile wireless device, a mobile communication device, a tablet, a handset, or other type of mobile wireless device. The mobile device can include one or more antennas configured to communicate with a base station (BS), an evolved Node B (eNB), or other type of wireless wide area network (WWAN) access point. The mobile device can be configured to communicate using at least one wireless communication standard including 3GPP LTE, WiMAX, High Speed Packet Access (HSPA), Bluetooth, and WiFi. The mobile device can communicate using separate antennas for each wireless communication standard or shared antennas for multiple wireless communication standards. The mobile device can communicate in a wireless local area network (WLAN), a wireless personal area network (WPAN), and/or a wireless wide area network (WWAN).

FIG. 6 also provides an illustration of a microphone and one or more speakers that can be used for audio input and output from the mobile device. The display screen may be a liquid crystal display (LCD) screen, or other type of display screen such as a organic light emitting diode (OLED) display. The display screen can be configured as a touch screen. The touch screen may use capacitive, resistive, or another type of touch screen technology. An application processor and a graphics processor can be coupled to internal memory to provide processing and display capabilities. A non-volatile memory port can also be used to provide data input/output options to a user. The non-volatile memory port may also be used to expand the memory capabilities of the mobile device. A keyboard may be integrated with the mobile device or wirelessly connected to the mobile device to provide additional user input. A virtual keyboard may also be provided using the touch screen.

It should be understood that many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions, which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. The modules may be passive or active, including agents operable to perform desired functions.

Various techniques, or certain aspects or portions thereof, may take the form of program code (i.e., instructions) embodied in tangible media, such as floppy diskettes, CD-ROMs, hard drives, or any other machine-readable storage medium wherein, when the program code is loaded into and executed by a machine, such as a computer, the machine becomes an apparatus for practicing the various techniques. In the case of program code execution on programmable computers, the computing device may include a processor a storage medium readable by the processor (including volatile and non-volatile memory and/or storage elements), at least one input device, and at least one output device. One or more programs that may implement or utilize the various techniques described herein may use an application programming interface (API), reusable controls, and the like. Such programs may be implemented in a high level procedural or object oriented programming language to communicate with a computer system. However, the program(s) may be implemented in assembly or machine language, if desired. In any case, the language may be a compiled or interpreted language, and combined with hardware implementations.

Reference throughout this specification to "one embodiment" or "an embodiment" means that a particular feature, structure, or characteristic described in connection with the embodiment is included in at least one embodiment of the present invention. Thus, appearances of the phrases "in one embodiment" or "in an embodiment" in various places throughout this specification are not necessarily all referring to the same embodiment.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and example of the present invention may be referred to herein along with alternatives for the various components thereof. It is understood that such embodiments, examples, and alternatives are not to be construed as defacto equivalents of one another, but are to be considered as separate and autonomous representations of the present invention.

Furthermore, the described features, structures, or characteristics may be combined in any suitable manner in one or more embodiments. In the following description, numerous specific details are provided, such as examples of materials, fasteners, sizes, lengths, widths, shapes, etc., to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

While the forgoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

What is claimed is:

1. An opportunistic cross radio access technology (RAT) bandwidth allocation system comprising:
    a wireless wide area network (WWAN) radio configured to be used as a primary cell (PCell) to communicate with a dual mode mobile wireless device on a licensed band; and
    a wireless local area network (WLAN) radio integrated with the WWAN radio to form a dual mode eNB and configured to be used as a secondary cell (SCell) to provide additional wireless connectivity to the dual mode mobile wireless device in an unlicensed band that is controlled by the PCell;
    wherein the PCell provides network access and mobility control for the dual mode mobile wireless device and also supports an opportunistic cross carrier bandwidth allocation through a multi-Radio Access Technology (RAT) aggregation and coordination (MRAT AC) module in the downlink and uplink of the SCell in the unlicensed band.

2. The system of claim 1, wherein a first a multi-Radio Access Technology (RAT) aggregation and coordination (MRAT AC) module is located in the radio resource control (RRC) of a WWAN radio in the dual mode eNodeB (eNB) and communicates with a network driver interface in a WLAN radio in the eNB to provide coordination of flow aggregation or switching across carriers when requested by the dual mode eNB via the PCell.

3. The system of claim 2, wherein a second MRAT AC module is located in the radio resource control (RRC) of a WWAN radio in the dual mode mobile wireless device and communicates with a network driver interface in a WLAN radio of the dual mode mobile wireless device to provide coordination of flow aggregation or switching across carriers in the dual mode mobile wireless device when requested by the dual mode eNB via the PCell.

4. The system of claim 3, wherein the at least one of the first and second MRAT AC modules are configured to dynamically switch traffic flows between the WWAN radio and the WLAN radio in the dual mode wireless device and the eNB, respectively, based on a link condition of the WWAN and WLAN between the dual mode wireless device and the eNB.

5. The system of claim 1, wherein the unlicensed band is located in at least one of the industrial, scientific and medical (ISM) radio bands.

6. The system of claim 1, wherein the WLAN radio in the dual mode wireless device and the eNB provides the additional wireless connectivity according to a specification selected from the group consisting of Institute of Electrical and Electronics Engineers (IEEE) 802.11a, 802.11b, 802.11g, 802.11n, 802.11y, IEEE 802.15, and Bluetooth.

7. The system of claim 1, wherein the WWAN radio in the dual mode wireless device and the eNB operates according to a specification selected from the group consisting of Third Generation Partnership Project (3GPP) Long Term Evolution (LTE), 3GPP High Speed Data Access (HSPA) or Institute of Electrical and Electronics Engineers (IEEE) 802.16.

8. The system of claim 1, wherein the WWAN radio in the dual mode mobile wireless device communicates to the WWAN radio in the eNB via the PCell a support capability of the dual mode mobile wireless device for carrier aggregation across the licensed carrier and the unlicensed carrier.

9. The system of claim 1, wherein the WWAN radio in the dual mode eNB communicates discovery information for the WLAN radio to the WWAN radio in the dual mode mobile wireless device, the discovery information selected from the group consisting of a network identifier of the SCell, a service set identifier (SSID) of the SCell, a homogeneous SSID of the SCell, a home operator of the SCell, a roaming partner list of the SCell, radio parameters of the SCell, and a connection mode of the SCell.

10. The system of claim 1, wherein the dual mode mobile wireless device communicates link quality indicators for communication with the WLAN through the SCell or PCell, wherein the link quality indicators are communicated through the PCell to enable the eNB to determine a quality of service (QoS) of the communication with the WLAN and best use of bandwidths in the licensed carrier and the unlicensed carrier based on the link quality indicators, and loading on the PCell and the SCell.

11. The system of claim 1, wherein data packets communicated from the WLAN radio at the eNB to the WLAN radio at the dual mode mobile wireless device via the SCell are encapsulated in a WLAN frame to allow the WLAN to act as a layer 2 (L2) transport.

12. The system of claim 1, wherein the WLAN radio is integrated directly with the WWAN radio and the WWAN radio is contained in at least one of a pico cell, a femto cell, and a home eNB gateway.

13. The system of claim 1, wherein the WWAN radio in the dual mode eNB communicates with the WWAN radio in the dual mode mobile wireless device via a relay node and a WLAN radio is integrated directly with the relay node to communicate with the WLAN radio in the dual mode mobile wireless device.

14. The system of claim 1, wherein the WWAN radio in the eNB is in communication with a plurality of remote radio elements (RRE), and a separate WLAN radio is integrated directly with at least one of the RREs.

15. The system of claim 1, wherein the dual mode mobile wireless device is configured to connect to at least one of the wireless local area network (WLAN), a wireless personal area network (WPAN), and the wireless wide area network (WWAN), wherein the dual mode mobile wireless device includes an antenna, a touch sensitive display screen, a speaker, a microphone, a graphics processor, an application processor, internal memory, a non-volatile memory port, or combinations thereof.

16. A method for conducting cross radio access technology (RAT) bandwidth allocation across a wireless wide area network (WWAN) and a wireless local area network (WLAN) comprising:
providing a dual mode access point having a WWAN radio integrated with a WLAN access point, wherein the WWAN radio is configured to be used as a primary access cell (PCell) in a licensed band and the WLAN access point is configured to be used as a secondary access cell (SCell) in an unlicensed band;
communicating discovery information for the WLAN access point via the PCell to a dual mode mobile wireless device;
forming a data link between the WLAN access point and the dual mode mobile wireless device using the discovery information;
receiving measurements at the dual mode access point regarding link quality indicators of the WLAN data link via the PCell; and
opportunistically offloading traffic flows from the WWAN to the WLAN data link based, in part, on the received measurements to provide on-demand bandwidth allocations to the dual mode mobile wireless device in at least one of the licensed band and the unlicensed band.

17. The method of claim 16, further comprising communicating the discovery information through at least one of broadcasting the discovery information from the WWAN radio to the dual mode mobile communication device and sending the discovery information to the dual mode mobile communication device through radio resource control signaling via the PCell.

18. The method of claim 16, wherein forming a data link further comprises forming a Layer 2 (L2) data link between the WLAN radio and a WLAN radio in the dual mode mobile wireless device, wherein each WLAN radio is an Institute of Electrical and Electronics Engineers (IEEE) 802.11 (WiFi) radio, wherein the data link is formed in at least one of an infrastructure mode, an adhoc mode, and a WiFi-direct mode.

19. The method of claim 16, wherein receiving measurements at the dual mode access point regarding link quality indicators of the WLAN data link further comprises receiving measurements via the PCell from a WWAN module in the dual mode mobile wireless device, the measurements selected from the group consisting of Received Signal Strength Indication (RSSI), packet delay, packet loss rate, packet delay, jitter, Channel State Information (CSI), and a Modulation and Coding Scheme (MCS).

20. The method of claim 16, further comprising turning off the data link between the WLAN access point and the dual mode mobile wireless device when at least one traffic flow is not offloaded to the WLAN data link.

21. A computer program product, comprising a non-transitory computer usable medium having a computer readable program code embodied therein, the computer readable program code adapted to be executed to implement a method for conducting cross radio access technology (RAT) bandwidth allocation across a wireless wide area network (WWAN) and a wireless local area network (WLAN), comprising:
linking the WWAN and the WLAN in a dual mode access point having a primary access cell (PCell), configured to communicate via a WWAN access point in a licensed band, and a secondary access cell (SCell), configured to communicate via a WLAN access point in an unlicensed band, wherein the WWAN access point and WLAN access point are linked through a multi-Radio Access Technology (RAT) aggregation and coordination (MRAT AC) module;
communicating discovery information for the WLAN access point via the PCell to a dual mode mobile wireless device;
forming a data link between the WLAN access point and the dual mode mobile wireless device using the discovery information;

receiving measurements at the dual mode access point regarding link quality indicators of the WLAN data link via the WWAN; and opportunistically offloading traffic flows from the WWAN to the WLAN data link using the MRAT AC module based, in part, on the received measurements to provide on-demand bandwidth allocations to the dual mode mobile wireless device.

22. The computer program product of claim 21, further comprising communicating the discovery information through at least one of broadcasting the discovery information via the PCell to the dual mode mobile communication device and sending the discovery information to the dual mode mobile communication device through radio resource control signaling.

23. The computer program product of claim 21, wherein forming a data link further comprises forming a Layer 2 (L2) data link between the WLAN access point and a WiFi module in the dual mode mobile wireless device, wherein the data link is formed in at least one of an infrastructure mode, an adhoc mode, and a WiFi-direct mode.

24. The computer program product of claim 23, further comprising turning off the data link between the WLAN access point and the dual mode mobile wireless device when at least one traffic flow is not offloaded to the WLAN data link.

* * * * *